United States Patent [19]

Takeuchi et al.

[11] Patent Number: 6,068,807
[45] Date of Patent: *May 30, 2000

[54] PROCESS FOR PRODUCING A BUMPER FOR A VEHICLE

[75] Inventors: Atsushi Takeuchi; Minoru Makuta; Hitoshi Ohgane, all of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,917

[22] Filed: Nov. 1, 1996

[30] Foreign Application Priority Data

Nov. 2, 1995 [JP] Japan ................................ 7-286205

[51] Int. Cl.⁷ ............................. B29C 45/16; B60R 19/03
[52] U.S. Cl. ...................... 264/255; 264/328.8; 425/130; 293/120
[58] Field of Search .................. 264/255, 328.8, 264/245, 45.1, 46.6; 425/130; 293/120

[56] References Cited

U.S. PATENT DOCUMENTS

| | | | |
|---|---|---|---|
| 3,878,282 | 4/1975 | Bonis et al. | |
| 4,120,922 | 10/1978 | Lemelson | 264/40.7 |
| 4,366,110 | 12/1982 | Morita et al. | 264/328.13 |
| 4,550,043 | 10/1985 | Beck | 428/36 |
| 5,059,361 | 10/1991 | Da Re' | 264/25 |
| 5,125,817 | 6/1992 | Yamachika | 425/130 |
| 5,178,805 | 1/1993 | Yokota | 264/40.1 |
| 5,423,673 | 6/1995 | Sawae et al. | 425/572 |
| 5,433,910 | 7/1995 | Mukai et al. | 264/255 |
| 5,645,786 | 7/1997 | Okada et al. | 264/255 |

FOREIGN PATENT DOCUMENTS

| | | |
|---|---|---|
| 2 494 185 | 5/1982 | France . |
| 2087299 | 5/1982 | United Kingdom . |
| 2087299A | 5/1982 | United Kingdom . |
| WO93/17855 | 9/1993 | WIPO . |

*Primary Examiner*—Jan H. Silbaugh
*Assistant Examiner*—Suzanne E Mason
*Attorney, Agent, or Firm*—Nakaido, Marmelstein Murray & Oram, LLP

[57] ABSTRACT

A process for producing a bumper for a vehicle uses a first step of injecting an outer layer forming material into a bumper forming cavity through a gate in a mold, and a second step of injecting a core forming material, thereby allowing the core forming material to flow into the outer layer forming material existing in said gate and said cavity, while allowing the outer layer and core forming materials to flow within the cavity. In the mold, the volume of a mounting portion forming area of the bumper forming cavity is set so that the thickness $t_1$ of at least a mounting portion of the bumper for mounting to a vehicle body to extend laterally from a central portion of the vehicle body can be larger than the thickness $t_2$ of a bumper main portion excluding the mounting portion, and the gate opens into the mounting portion forming area. Thus, the outer layer forming material can be allowed to flow substantially uniformly over the entire cavity, thereby enhancing the filling rate of the core forming material.

7 Claims, 8 Drawing Sheets

PROCESS FOR PRODUCING A BUMPER FOR A VEHICLE

BACKGROUND OF THE INVENTION

1. Field of the Invention

The present invention relates to a process for producing a bumper for a vehicle and particularly, to an improvement in a process for producing a bumper for a vehicle, which is made of a synthetic resin and has a sandwich structure including a core and an outer layer covering the core, the process including a first step of injecting an outer layer forming material into a bumper forming cavity through a gate in a mold, and a second step of injecting a core forming material, thereby allowing the core forming material to flow into the outer layer forming material existing in the gate and cavity, while allowing the outer layer and core forming materials to flow within the cavity.

2. Description of the Related Art

In such a conventional bumper, the thickness thereof is set such that it is relatively thin and substantially uniform in its entirety, and a mounting portion for mounting to a vehicle body to extend laterally from a central portion of the vehicle body forms a rear edge of a front and upper portion of the bumper. In this case, a gate opens into a mounting portion forming area of the bumper forming cavity in the mold.

In the process for producing the bumper, while the outer layer forming material is flowing within the cavity, the core forming material is allowed to flow into the outer layer forming material. However, after a front portion of the outer layer forming material in a flowing direction has reached to a terminal end of the cavity to stop its flowing, it is difficult to allow the core forming material to flow into the front portion of the outer layer forming material in the flowing direction.

In an attempt to produce a bumper using the mold under such a situation, when the outer layer forming material is injected into the cavity, the capability to distribute the material into the mounting portion forming area in a lengthwise direction of the cavity (in a lateral direction of the vehicle body) is low due to a small volume (i.e., a narrowness) of the mounting portion forming area. For this reason, as compared with the time taken for the outer layer forming material to reach a central end area of the cavity nearer to the mounting portion forming area to stop its flowing, the time taken for the outer layer forming material to reach lengthwise opposite end areas remoter from the mounting portion forming area to stop its flowing is remarkably long. As a result, in the central end area, the core forming material fails to flow into the outer layer forming material. Due to this, it is impossible to produce the bumper having a sandwich structure in its entirety.

SUMMARY OF THE INVENTION

Accordingly, it is an object of the present invention to provide a producing process of the above-described type, wherein the capability to distribute the material into the mounting portion forming area of the cavity in the lengthwise direction of the cavity can be enhanced, thereby producing a bumper having a sandwich structure.

To achieve the above object, according to the present invention, there is provided a process for producing a bumper for a vehicle, which is made of a synthetic resin and has a sandwich structure comprised of a core and an outer layer covering the core, the process comprising: a first step of injecting an outer layer forming material into a bumper forming cavity through a gate in a metal mold, in which the volume of a mounting portion forming area of the bumper forming cavity is set such that a thickness of at least a mounting portion of the bumper which is to be mounted to a vehicle body and which extends laterally from a central portion of the vehicle body can be larger than a thickness of a bumper main portion excluding the mounting portion, the gate opening into the mounting portion forming area; and a second step of injecting a core forming material, thereby allowing the core forming material to flow into the outer layer forming material existing in the gate and the cavity, while allowing the outer layer and core forming materials to flow into the cavity.

If the volume of the mounting portion forming area of the cavity is set in the above-described manner, the resistance to the flowing of the outer layer forming material in the mounting portion forming area is alleviated, leading to an enhanced capability to distribute the material into such area in a lengthwise direction of the cavity. This results in a decreased difference between the time taken for the outer layer forming material to reach a central end area of the cavity nearer to the mounting portion forming area to stop its flowing and the time taken for the outer layer forming material to reach lengthwise opposite end areas remoter from the mounting portion forming area to stop its flowing. Thus, it is possible to allow the core forming material to flow substantially uniformly into the outer layer forming material in the central end area and the lengthwise opposite end areas to produce a high quality bumper having a sandwich structure in its entirety.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of preferred embodiments with reference to the accompanying drawings.

Figure 1:
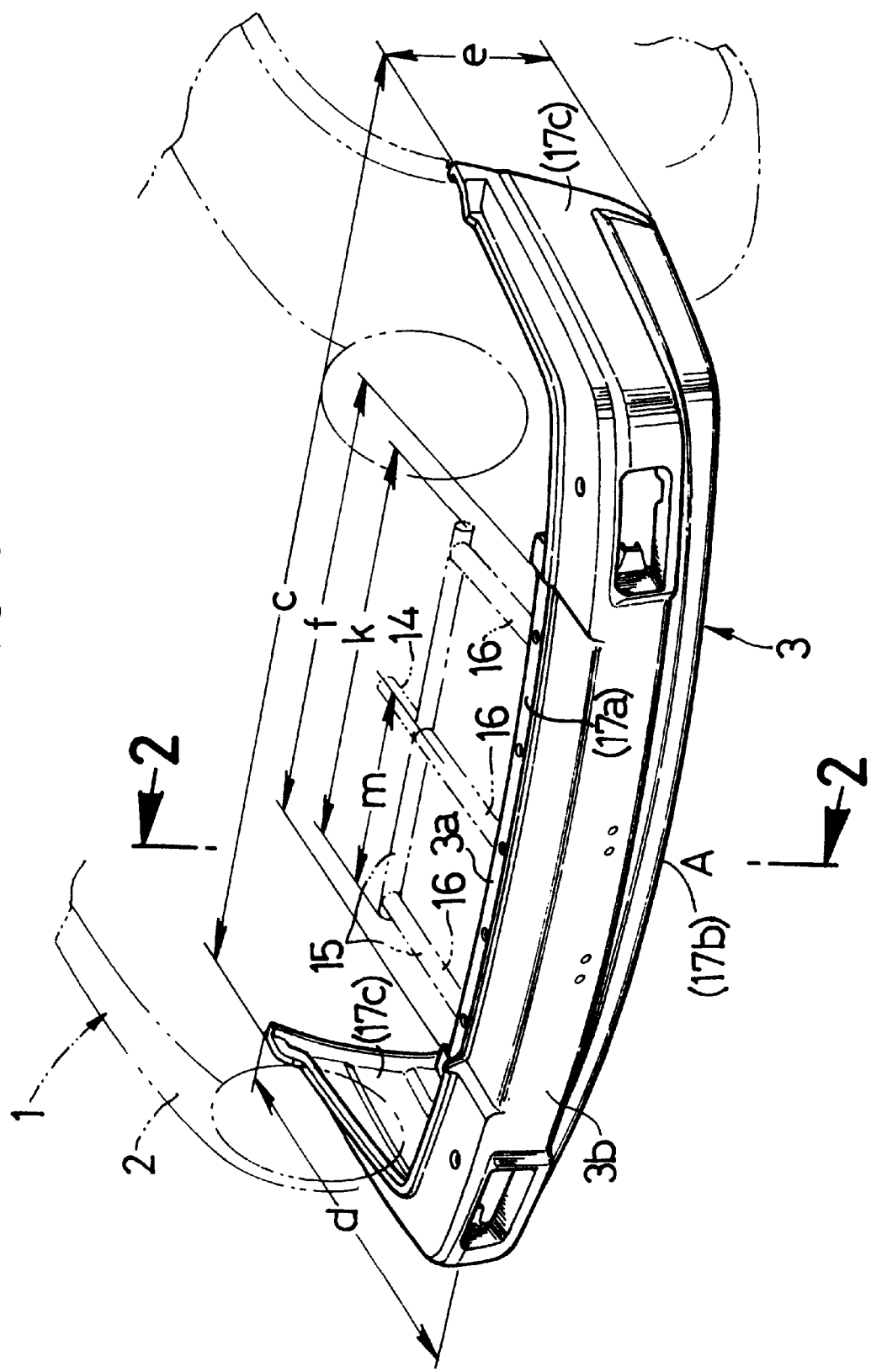
FIG. 1 is a perspective view of a bumper.
Figure 2:
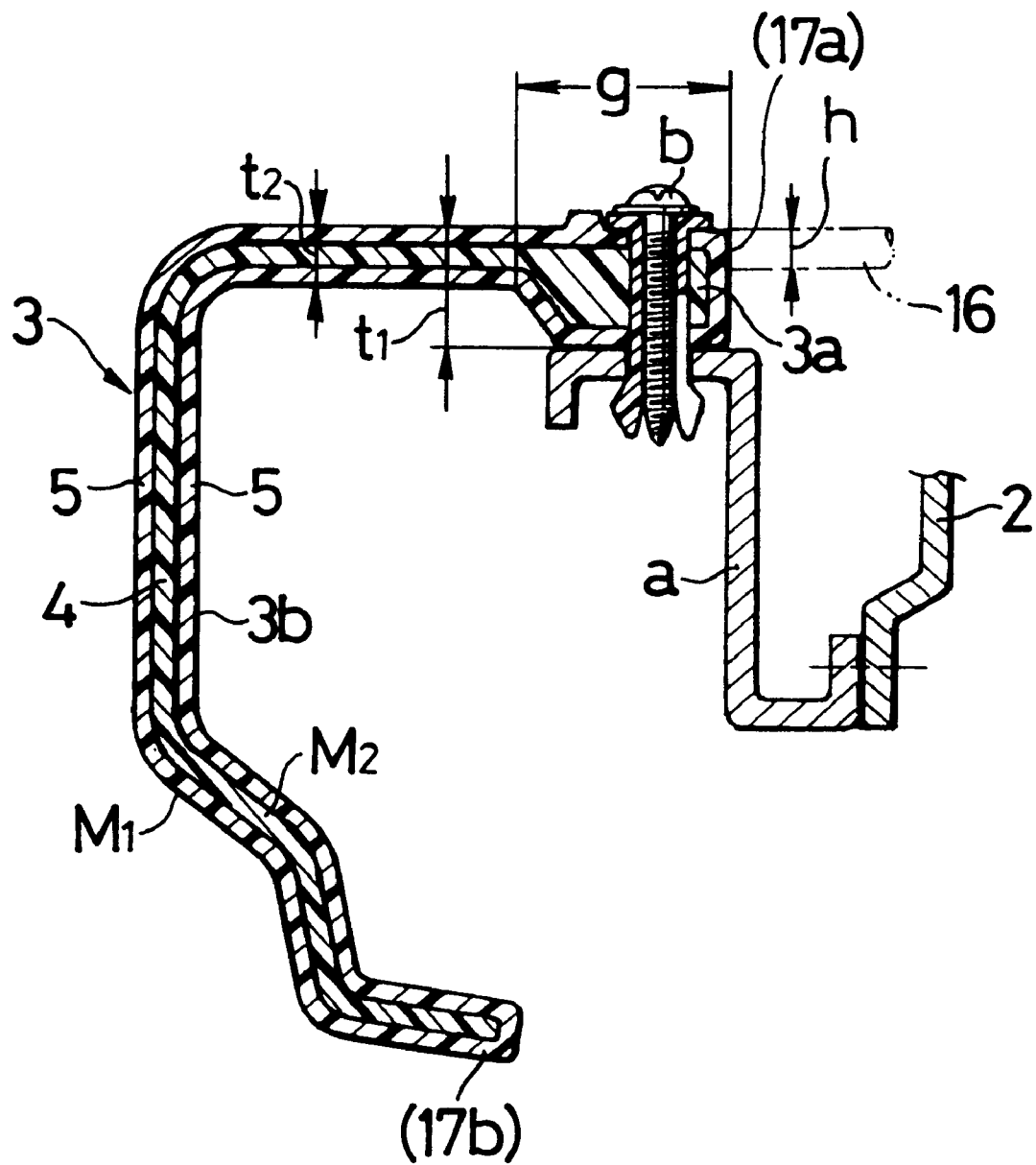
FIG. 2 is a sectional view in FIG. 1.

Referring to FIG. 1, a bumper 3 made of a synthetic resin and having a sandwich structure is mounted to a front portion of a vehicle body 2 of an automotive vehicle 1. The sandwich structure is comprised of a core 4 and an outer layer 5 covering the core 4, as shown in FIG. 2. The bumper 3 has a band-like portion 3a for mounting to the vehicle body 2, and extending laterally from a central portion of the vehicle body A. This mounting portion 3a forms a substantially one third of a rear edge of a front upper portion of the bumper 3 and has a wall thickness $t_1$ which is larger than a wall thickness $t_2$ of a main bumper portion 3b excluding the mounting portion 3a. For example, a relation, $t_1 \geq 1.5\ t_2$ is established between both the wall thicknesses $t_1$ and $t_2$.

The mounting portion 3a is mounted at one end of a steel beam a by a plurality of clips b, and the other end of the beam a is mounted to the vehicle body 2. Therefore, it is effective to increase the wall thickness $t_1$ of the mounting portion 3a for enhancing the mounting strength of the bumper 3.

The core 4 is formed from a main material which is produced by pulverizing a recovered bumper which is formed using a polypropylene (PP) modified by an ethylene propylene rubber (EPR) and which has a thermo-setting synthetic resin on a surface thereof. The outer layer 5 is formed from a main material which is a polypropylene modified by an ethylene-propylene rubber.

Figure 3:
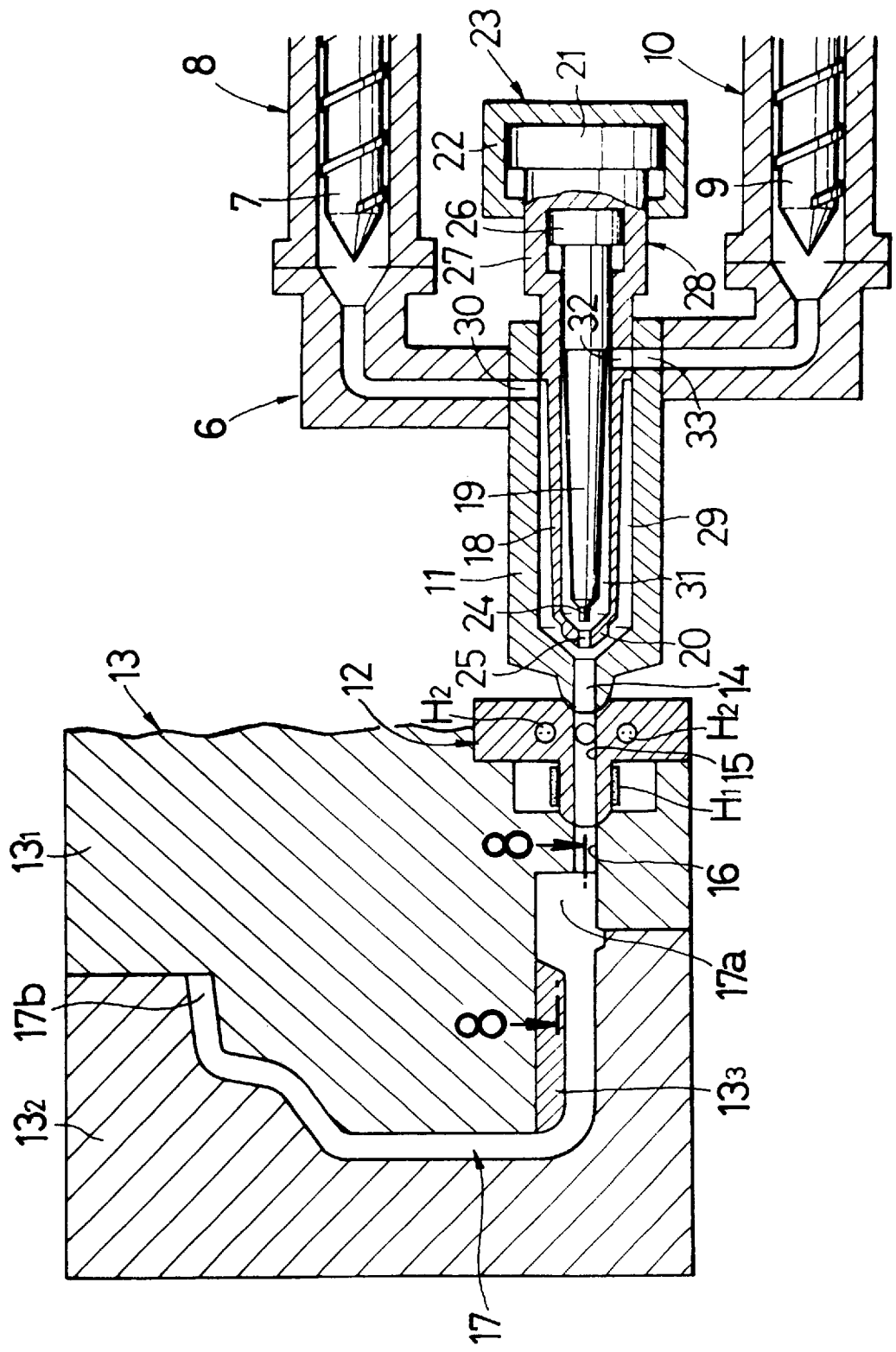
FIG. 3 is a vertical sectional view of an injection molding apparatus.

Referring to FIG. 3, an injection molding apparatus 6 used for producing the bumper 3 includes a first injection unit 10 having a screw 7 to inject an outer layer forming material, a second injection screw 10 having a screw to inject a core forming material, a nozzle 11 which connects both the injection units 8 and 10 to each other, a hot runner block 12 connected to the nozzle 11, and a split metal mold 13 detachably mounted to the hot runner block 12. The metal mold 13 is comprised of a stationary die 13, mounted on the hot runner block 12, and a plurality of movable dies 132 and 133 which are movable toward and from the stationary die 131.

A supply passage 14 in the nozzle 14 communicates with a plurality of gates 16 in the metal mold 13 through a hot runner 15. Each of the gates 16 communicates with a mounting portion forming area 17a in a bumper forming cavity 17. The mounting portion forming area 17a has a volume which is set so that the thickness $t_1$ of the mounting portion 3a is larger than the thickness $t_2$ of the bumper main portion 3b. In Figures, $H_1$ is a bumper heater, and $H_2$ is a cartridge heater.

A hollow outer needle 18 and a solid inner needle 19 are disposed concentrically within the nozzle 11. In the outer needle 18, a valve portion 20 at a tip end is opposed to the supply passage 14, and a piston 21 is provided at a base end and slidably received in a cylinder 22. The piston 21 and the cylinder 22 constitute a supply passage opening/closing mechanism 23. In the inner needle 19, a valve portion 24 at a tip end is opposed to a valve bore 25 defined in the valve portion 20 of the outer needle 18, and a piston 26 is provided at a base end and slidably received in a cylinder 27 defined at the base end of the outer needle 18. The piston 26 and the cylinder 27 constitute a valve bore opening/closing mechanism 28.

The outer needle 18 has a tapered outer peripheral surface connected to the valve portion 20, and an outer passage 29 is defined between the tapered outer peripheral surface and an inner peripheral surface of the nozzle 11. The outer passage 29 is adapted to communicate at one end thereof with the supply passage 14 and at the other end thereof with the first injection unit 8 through a through-hole 30 in the nozzle 11. The outer needle 18 has a straight cuter peripheral surface at its base end, so that the through-hole 30 can be closed by such outer peripheral surface.

The inner needle 19 has a tapered outer peripheral surface connected to the valve portion 24 thereof, and an inner passage 31 is defined between such tapered outer peripheral surface and the inner peripheral surface of the outer needle 18. The inner passage 31 is adapted to communicate at one end thereof with the valve bore 25 and at the other end thereof with the second injection unit 10 through through-holes 32 and 33 in the nozzle 11. The inner needle 19 has a straight outer peripheral surface at its base end, so that the through-hole 32 can be closed by such outer peripheral surface.

A specified example for producing the bumper 3 using the injection molding apparatus 6 will be described below.

Referring to FIGS. 1 and 2, the dimensions of portions of the bumper 3 are as follows: On the basis of the vehicle body 2, the lateral length c=1700 mm; the longitudinal length d=550 mm, the height e=300 mm; the lateral length f of the mounting portion 3a=1200 mm; the longitudinal length g=40 mm; the thickness $t_1$=6 mm; and the thickness $t_2$=4 mm. A relation, $t_1$=1.5 $t_2$ is established between both the thicknesses $t_1$ and $t_2$.

The dimensions of portions of the cavity 17 are determined depending upon the shape of the bumper 3. In this case, the number of the gates 16 is three; the diameter h of the gate 16=1.5 mm; the lateral length k of the hot runner 15=900 mm; and the length m between a center line of the supply passage 14 and the left and right ends of the hot runner 15=450 mm.

A. Preparation of core forming material

A recovered bumper molded using a polypropylene modified by an ethylene-propylene rubber and having a two-pack urethane coating on a surface thereof was selected. The composition of the recovered bumper is as follows:

| | |
|---|---|
| Polypropylene | 64% by weight |
| Ethylene-propylene rubber | 28% by weight |
| Talc | 7% by weight |
| Coating | 1% by weight |

The recovered bumper was thrown into a pulverizer and pulverized therein. Then, the pulverized material was thrown into and molten and kneaded in a granulator. The resulting molten/kneaded material was passed through a filter of 80 to 100 mesh, whereby large particles were removed. Thereafter, the molten/kneaded material was passed through a capillary having an inside diameter of 1 mm to form a linear material. The linear material was cut into a length of 1 to several mm to provide a pellet-like core forming material.

B. Preparation of outer layer forming material

A mixture including

| | |
|---|---|
| Polypropylene | 63% by weight |
| Ethylene-propylene rubber | 30% by weight |
| Talc | 7% by weight | to provide the same composition as the recovered bumper (however, the coating is excluded) was thrown into the granulator and subjected to the same procedure as in the above-described item A to produce a pellet-like outer later forming material.

C. Production of bumper (i) In FIG. 3, the outer layer forming material was placed into the first injection unit 8 and maintained in a molten state of 210° C. The core forming material was placed into the second injection unit 10 and maintained in a molten state of 200° C. The preheating temperatures of the stationary die $13_1$ and the movable dies $13_2$ and $13_3$ are 40° C. and 50° C., respectively.

Figure 4:
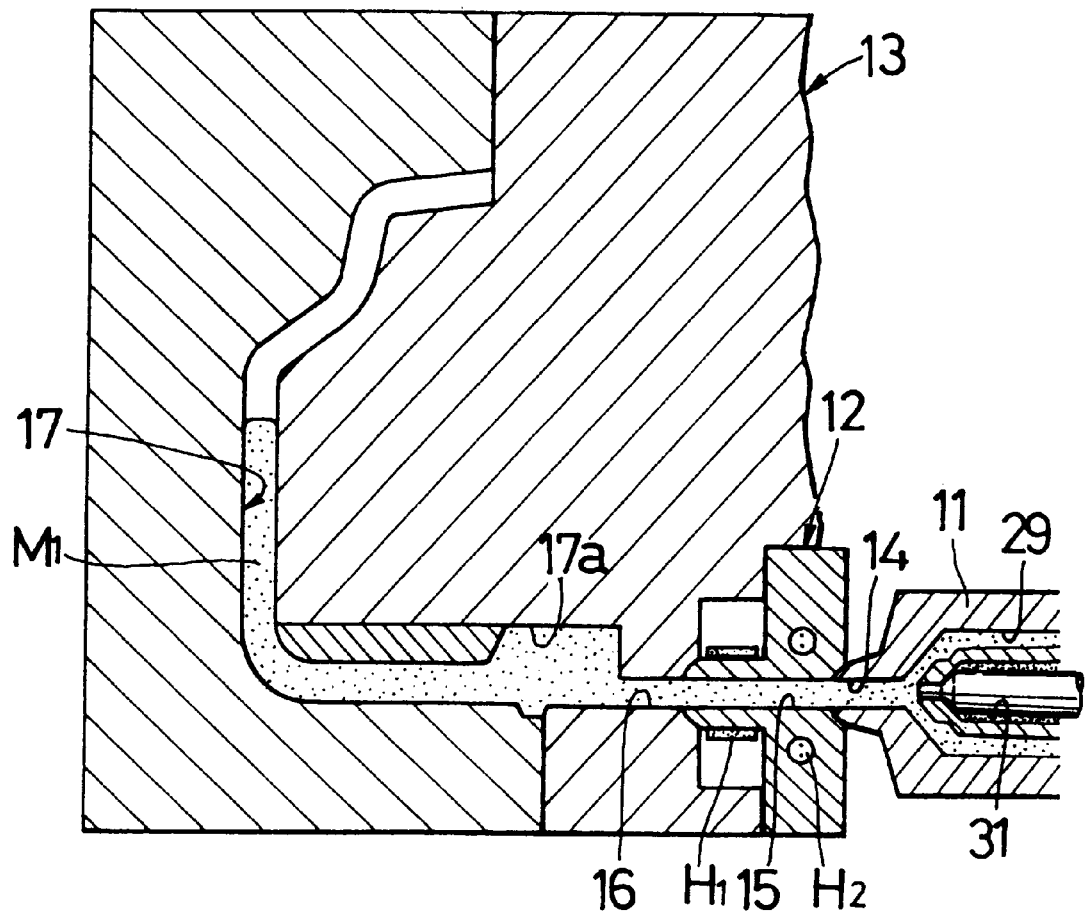
FIG. 4 is a view for illustrating a first step.

(ii) At a first step, in a condition in which the outer passage 29 was in a connected state and the inner passage 31 was in a disconnected state, the outer layer forming material $M_1$ was injected into the bumper forming cavity 17 through the supply passage 14, the hot runner 15 and the gates 16 under operation of the first injection unit 8, as shown in FIG. 4.

Figure 5:
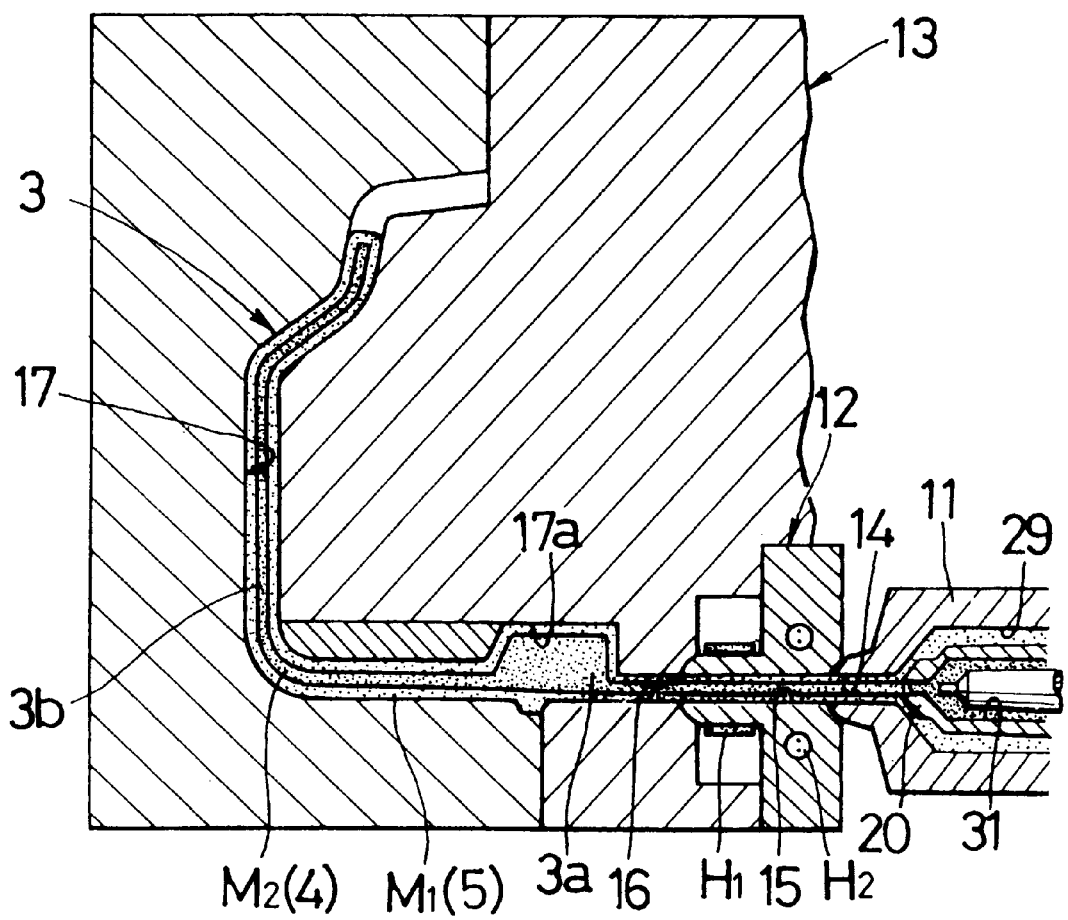
FIG. 5 is a view for illustrating a second step.

(iii) At a second step, a portion of the outer passage 29 adjacent the supply passage 14 was throttled by the valve portion 20 under operation of the first injection unit 8, as shown in FIG. 5. In a condition in which the inner passage 31 was in a connected state, the core forming material $M_2$ was injected under operation of the second injection unit 10, whereby the core forming material $M_2$ is allowed to flow into the outer layer forming material $M_1$ in the supply passage 14, the hot runner 15, the gates 16 and the cavity 17, and the outer layer and core forming materials $M_1$ and $M_2$ are allowed to flow within the cavity 17. Then, the operation of the second injection unit 10 was stopped.

Figure 6:
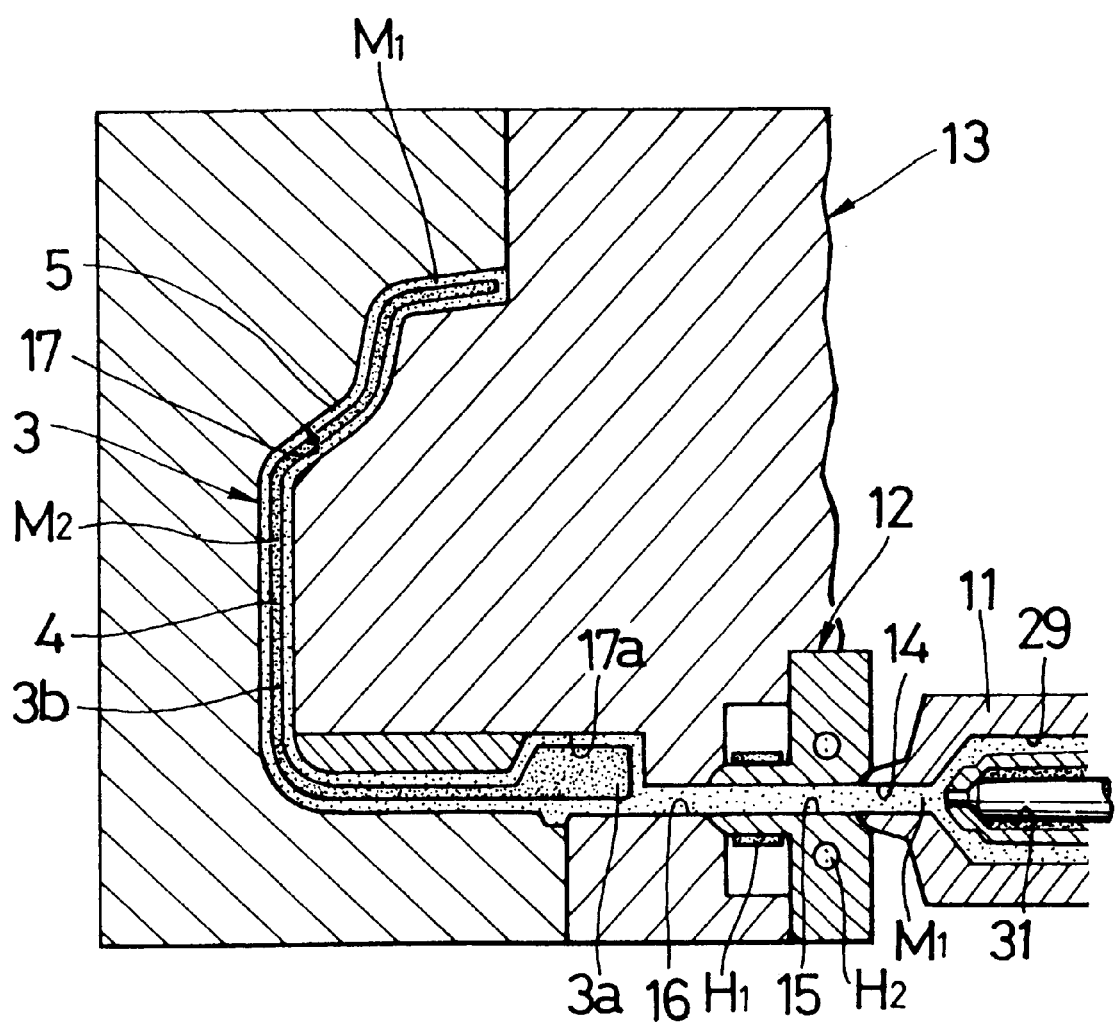
FIG. 6 is a view for illustrating a third step.

(iv) At a third step, in the condition in which the outer passage 29 was in the connected state and the inner passage 31 was in the disconnected state, the outer layer and core forming materials $M_1$ and $M_2$ of a double structure existing in the supply passage 14, the hot runner 15 and the gates 16 were pushed into the cavity 8 by the outer layer forming material under operation of the first injection unit 8, as shown in FIG. 6, thereby forming a core 4 and an outer layer 5. Then, the operation of the first injection unit 8 was stopped.

(v) The metal mold 13 was moved away from the hot runner block 12 and then, the mold opening was conducted to provide a bumper 3.

After the above-described producing process, the outer layer forming material $M_1$ is retained in a molten state within the hot runner 15 and hence, the molding of the bumper 3 can be carried out continuously.

Table 1 shows the injection time and the injection speed for the outer layer forming material $M_1$ and the core forming material $M_2$ relating to the first, second and third steps in the production of the bumper 3.

TABLE 1

|  | Outer layer forming material | | Core forming material | |
| --- | --- | --- | --- | --- |
|  | Injection speed (mm/sec) | Injection time (sec) | Injection speed (mm/sec) | Injection time (sec) |
| First step | Va 46.0 | 5.3 | — | — |
|  | Vb 24.7 | 0.24 |  |  |
| Second step | Vb 24.7 | 1.78 | Ve 48.4 | 4.3 |
|  | Vc 15.1 | 1.79 |  |  |
|  | Vd 9.7 | 0.79 |  |  |
| Third step | Vc 9.7 | 1.6 | — | — |

Figure 7:
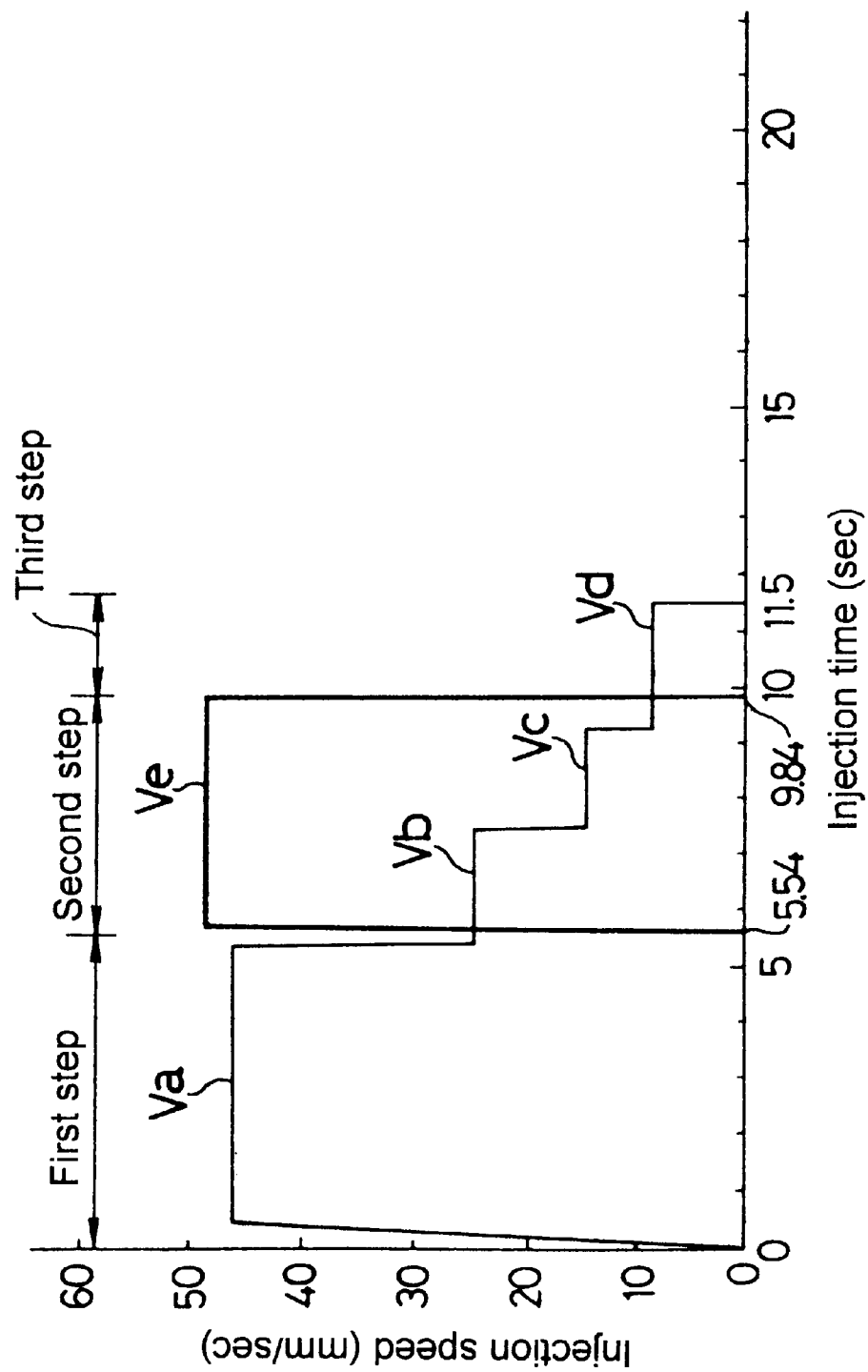
FIG. 7 is a graph illustrating the relationship between the injection time and the injection speed in an embodiment of the present invention.

FIG. 7 is based on Table 1 and shows the relationship between the injection time and the injection speed. In this case, the injection speed was controlled at two stages for the outer layer forming material $M_1$ at the first step; at one stage for the core forming material $M_2$ and at three stages for the outer layer forming material $M_1$ at the second step; and at one stage for the outer layer forming material $M_1$ at the third step.

Figure 8:
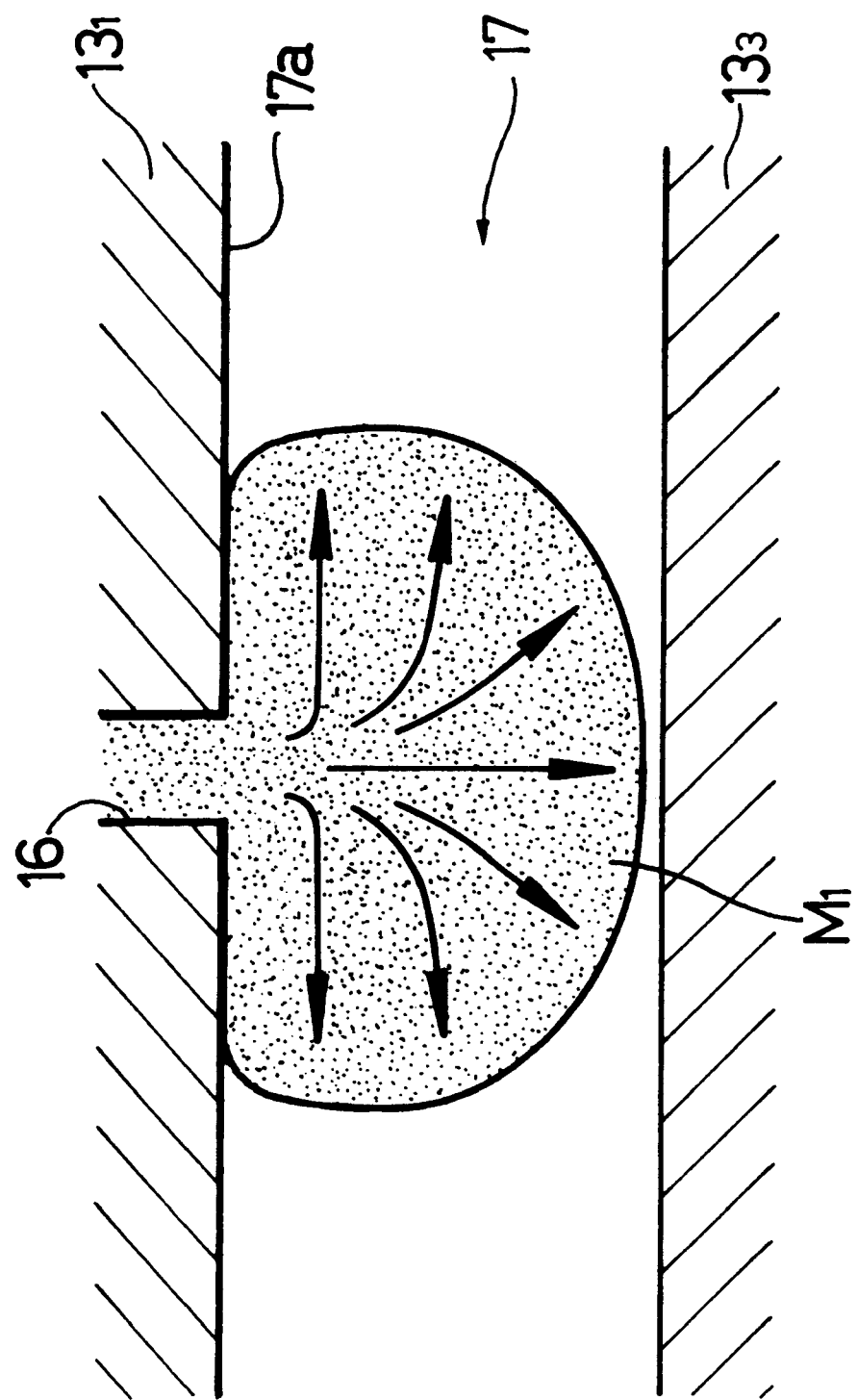
FIG. 8 is a sectional view taken along a line 8—8 in FIG. 3, illustrating the flowing of an outer layer forming material.

If the volume of the mounting portion forming area 17a of the cavity 17 is set so that it is increased in accordance with the thickness $t_1$ of the mounting portion 3a, as described above, the resistance to the flow of the outer layer forming material in the mounting portion forming area 17a is decreased and hence, the capability to distribute the material in a lengthwise direction of the cavity in the area 17a is enhanced, as shown in FIG. 8. As a result, a difference is decreased between the time taken for the outer layer forming material $M_1$ to reach a central end area 17b of the cavity 17 nearer the mounting portion forming area 18a to become stopped in flow as shown in the cavity in FIGS. 1 and 2 and the time taken for the outer layer forming material $M_1$ to reach lengthwise opposite-end areas 17c of the cavity 17 remoter from the mounting portion forming area 18a to become stopped in flow as shown in the bumper 3 in FIG. 1. Thus, the core forming material $M_2$ can be allowed to flow substantially equally into the outer layer forming material $M_1$ in the central end area 17b and in the lengthwise opposite-end areas 17c.

The bumper 3 produced in the above manner was excellent in quality and had a sandwich structure in its entirety. For the bumper 3, the filling rate of the core forming material prepared from the recovered bumper is high, which is effective for providing a reduction in production cost of the bumper 3 and a resources saving.

If the injection speed Ve of the core forming material $M_2$ at the second step is set higher than injection speeds Va and Vb of the outer layer forming material $M_1$ at the first step, it is possible to allow the a front portion of the core forming material as viewed in a flowing direction to flow into a front portion of the outer layer forming material as viewed in a flowing direction, thereby forming the bumper 3 into near a more perfect sandwich structure. In this case, if the injection speeds Vb, Vc and Vd of the outer layer forming material $M_1$ are set lower than the highest injection speed Va at the first step, the different between the injection speeds of both the materials $M_1$ and $M_2$ can be increased even if the injection speed Ve of the core forming material $M_2$ is less high.

If the injection speed Vd of the outer layer forming material $M_1$ at the third step is set at a value equal to or lower than the final injection speed of the outer layer forming material $M_1$ at the second step, e.g., at Vd in the production of this bumper 3, the outer layer forming material $M_1$ cannot flow into the core forming material $M_2$ at the third step, whereby the gate communication portion of the bumper 3 can be formed from only the outer layer forming material $M_1$.

For comparison, to produce a bumper 3 including a mounting portion 3a having a thickness $t_1$ equal to a thickness $t_2$ of a bumper main portion 3b, an attempt was made to produce a bumper as a comparative example under the same conditions as those described above, using a metal mold 13 having a narrower mounting portion forming area 17a. As a result, the following disadvantage was encountered: the core forming material $M_2$ failed to flow into the outer layer forming material $M_1$ in the central end area 17b, and the core forming material $M_2$ broke through the outer layer forming material $M_1$ to emerge onto the surface of the outer layer forming material $M_1$.

The outer layer forming material $M_1$ which may be used for the production of the bumper 3 includes the following examples:

[Composition example 1]

| Polypropylene | 63% by weight |
| --- | --- |
| Ethylene-propylene rubber | 30% by weight |
| Talc | 7% by weight |
| Weather-resistant stabilizer | 1 phr |
| Ultraviolet light absorber | 1 phr |
| Carbon black (pigment) | 3 phr |
| Coatability enhancing modifier | 3 phr |

[Composition example 2]

| | |
|---|---|
| Polypropylene | 60% by weight |
| Ethylene-propylene rubber | 30% by weight |
| Talc | 10% by weight |
| Weather resistant stabilizer | 1 phr |
| Ultraviolet light absorber | 1 phr |
| Carbon black (pigment) | 3 phr |
| Coatability enhancing modifier | 3 phr |

The core forming material $M_2$ which may be used for the production of the bumper 3 includes the following examples:

(1) A forming material consisting of 93% by weight of a combination of a polypropylene and 7% by weight of talc. In this case, the polypropylene contains 30% by weight of a ethylene-propylene based rubber simultaneously synthesized at a step of polymerization of the polypropylene. The talc was added to the polypropylene at a final step of the synthesis of the polypropylene. This forming material is more inexpensive than a forming material containing a polypropylene and an ethylene-propylene rubber separately produced and blended.

(2) A forming material containing the following components:

| | |
|---|---|
| Polypropylene | 60% by weight |
| Ethylene-propylene rubber | 30% by weight |
| Talc | 10% by weight |

The entire upper edge of the bumper 3 including the mounting portion 3a may be thickened to have a thickness $t_1$.

What is claimed is:

1. A process for producing a bumper for a vehicle, said bumper extending continuously in a lateral direction of the vehicle and having a main portion and a band-shaped mounting portion for mounting to a vehicle body, said main portion comprising an upper portion, a lower portion and a vertically extending portion intermediate and connecting said upper and lower portions, said mounting portion being connected to said upper portion of said main portion, having a thickness larger than that of said main portion and extending laterally from a central portion of the vehicle body, said bumper being made of a synthetic resin and having a sandwich structure comprised of a core and an outer layer covering said core, said process comprising the steps of:

providing a metal mold having a bumper forming cavity therein and a gate which is open to said bumper forming cavity at a cavity portion corresponding to substantially a laterally central location of said mounting portion of said bumper;

injecting an outer layer forming material for said bumper into said bumper forming cavity through said gate; and thereafter injecting a core forming material for said bumper into said bumper forming cavity, thereby allowing said core forming material to flow into said outer layer forming material existing in said gate and said cavity to form said sandwich structure, while allowing said outer layer and said core forming materials to flow into said cavity.

2. A process for producing a bumper for a vehicle according to claim 1, wherein an injection speed of said core forming material at said core forming material injecting step is higher than an injection speed of said outer layer forming material at said outer layer forming material injecting step.

3. A process for producing a bumper for a vehicle according to claim 1, wherein the thickness $t_1$ of said mounting portion is related to the thickness $t_2$ of said main portion in a relationship of $t_1 \geq 1.5 t_2$.

4. A process for producing a bumper for a vehicle according to claim 1, wherein after said outer layer forming material injecting step is performed, the subsequent core forming material injecting step is conducted while permitting said outer layer forming material to be continuously injected into said cavity also in said core forming material injecting step.

5. A process for producing a bumper, which is made of synthetic resin for a vehicle, said bumper extending continuously in a lateral direction of the vehicle and having a sandwich structure comprised of a core and an outer layer covering said core, said bumper having a main portion which comprises an upper portion, a lower portion and a vertically extending portion intermediate and connecting between said upper and lower portions, said bumper further having a band-shaped mounting portion connected to said upper portion of said main portion, said process comprising:

a first step of injecting an outer layer forming material for said bumper into a bumper forming cavity in a metal mold through a gate in said metal mold, in which the volume of a mounting portion forming area of the bumper cavity is set such that a thickness of at least said mounting portion of the bumper which is to be mounted to a vehicle body and which extends laterally from a central portion of the vehicle body is larger than a thickness of said bumper main portion, said gate opening into substantially a laterally central location of said mounting portion forming area; and a second step of injecting a core forming material for said bumper into said bumper forming cavity, thereby allowing said core forming material to flow into said outer layer forming material existing in said gate and said cavity, while allowing said outer layer and said core forming materials to flow into said cavity to form said sandwich structure, wherein the injection speed of said core forming material at said second step is higher than the injection speed of said outer layer forming material at said first step.

6. A process for producing a bumper for a vehicle according to claim 5, wherein the core forming material injecting step is conducted while permitting the outer layer forming material to be continuously injected into said cavity also in said core forming material injecting step.

7. A process for producing a bumper for a vehicle according to claim 5, wherein the thickness $t_1$ of said mounting portion is related to the thickness $t_2$ of said main portion in a relationship of $t_1 \geq 1.5 t_2$.

* * * * *